350-316
CROSS REFERENCE SEARCH ROOM

June 6, 1967 A. GAMBA 3,323,407

PATTERN RECOGNITION SYSTEM UTILIZING OPTICAL DEVICE
WHICH EXAMINES PATTERN IN SERIES-PARALLEL MANNER

Filed Jan. 7, 1964 5 Sheets-Sheet 1

INVENTOR
AUGUSTO GAMBA

BY Louis A. Kline
John J. Callahan
HIS ATTORNEYS

INVENTOR
AUGUSTO GAMBA

BY Louis A. Kline
John J. Callahan
HIS ATTORNEYS

June 6, 1967 A. GAMBA 3,323,407

PATTERN RECOGNITION SYSTEM UTILIZING OPTICAL DEVICE
WHICH EXAMINES PATTERN IN SERIES-PARALLEL MANNER

Filed Jan. 7, 1964 5 Sheets-Sheet 3

INVENTOR
AUGUSTO GAMBA

BY Louis A. Kline
John J. Callahan
HIS ATTORNEYS

FIG.12
| | | | | |
|---|---|---|---|---|
| 9 | 3 | 1 | 5 | 0 |
| 6 | 8 | 9 | 10 | 5 |
| 3 | 9 | 4 | 2 | 7 |
| 6 | 8 | 2 | 4 | 3 |
| 5 | 8 | 2 | 9 | 7 |
A
FIG.11
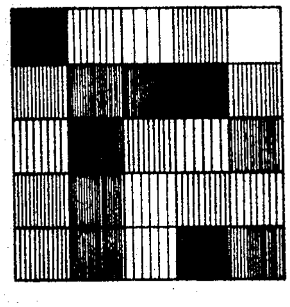
FIG.14
| | | | | |
|---|---|---|---|---|
| 3 | 5 | 9 | 2 | 0 |
| 7 | 10 | 6 | 8 | 6 |
| 5 | 2 | 3 | 4 | 5 |
| 2 | 1 | 3 | 8 | 9 |
| 7 | 5 | 3 | 8 | 2 |
B
FIG.13
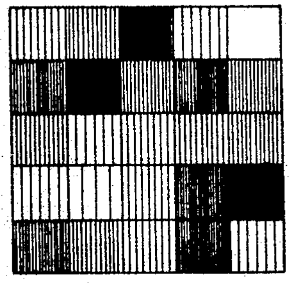
FIG.16
| | | | | |
|---|---|---|---|---|
| 1 | 7 | 9 | 5 | 10 |
| 4 | 2 | 1 | 0 | 5 |
| 7 | 1 | 6 | 8 | 3 |
| 4 | 2 | 6 | 8 | 7 |
| 5 | 2 | 8 | 1 | 3 |
$\bar{A}$
FIG.15
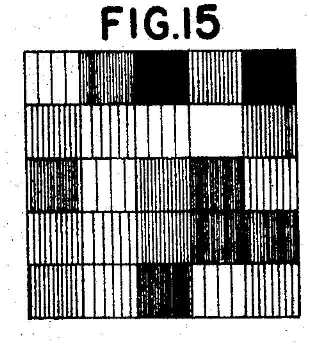
INVENTOR
AUGUSTO GAMBA
BY Louis A. Kline
John J. Callahan
HIS ATTORNEYS FIG.18
| | | | | |
|---|---|---|---|---|
| 4 | 10 | 10 | 7 | 10 |
| 10 | 10 | 7 | 8 | 10 |
| 10 | 3 | 9 | 10 | 8 |
| 6 | 3 | 10 | 10 | 10 |
| 10 | 7 | 10 | 9 | 5 |
$\bar{A}+B$
FIG.17
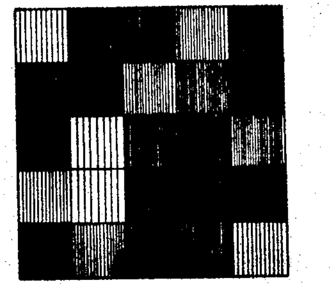
FIG.20
| | | | | |
|---|---|---|---|---|
| 7 | 5 | 1 | 8 | 10 |
| 3 | 0 | 4 | 2 | 4 |
| 5 | 8 | 7 | 6 | 5 |
| 8 | 9 | 7 | 2 | 1 |
| 3 | 5 | 7 | 2 | 8 |
$\bar{B}$
FIG.19
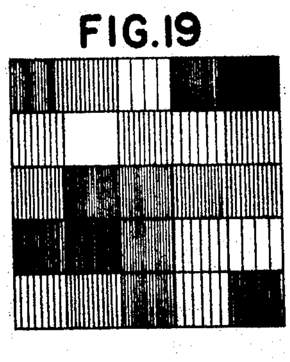
FIG.22
| | | | | |
|---|---|---|---|---|
| 10 | 8 | 2 | 10 | 10 |
| 9 | 8 | 10 | 10 | 9 |
| 8 | 10 | 10 | 8 | 10 |
| 10 | 10 | 9 | 6 | 4 |
| 8 | 10 | 9 | 10 | 10 |
$A+\bar{B}$
FIG.21
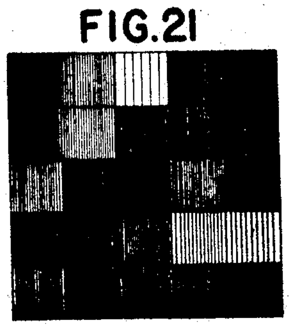
INVENTOR
AUGUSTO GAMBA
BY Louis A. Kline
John J. Callahan
HIS ATTORNEYS

United States Patent Office 3,323,407

Patented June 6, 1967

3,323,407

PATTERN RECOGNITION SYSTEM UTILIZING OPTICAL DEVICE WHICH EXAMINES PATTERN IN SERIES-PARALLEL MANNER

Augusto Gamba, Genoa, Italy, assignor to The National Cash Register Company, Dayton, Ohio, a corporation of Maryland

Filed Jan. 7, 1964, Ser. No. 336,256
Claims priority, application Italy, May 11, 1963, 9,402/63
8 Claims. (Cl. 88—1)

Figure 1:
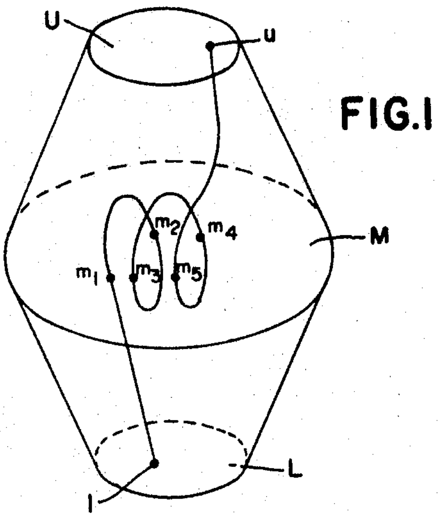

The present invention relates to a method for the recognition of patterns to discriminate between at least two classes of patterns, designated in the following as "Class A" and "Class B," "Class B" being also the class "not A"—that is, the class that includes all patterns that do not belong to "Class A"—and apparatus for the implementation of such a method—in particular, apparatus for the reading and recognition of alphanumeric characters.

The problem of recognizing patterns belonging to different classes—for instance, recognizing letter A from letter B, C, etc., as written by different people, or from different fonts, the various letters A to be recognized being "Class A" and the other letters being "Class B" or class "not A"—is accomplished with the present invention by an optical system.

In accordance with the method of the present invention, light is sent through a bundle of optical fibers or plurality of light-conducting channel fiber members having different paths, and the bundle is interrupted by a surface that contains the pattern to be recognized in a region of the bundle where said optical fibers are interrupted or cross the above-mentioned surface many times, obtaining in such a way that the light, that comes out of the bundle of optical fibers after having crossed the surface that contains the pattern, originates an image which is duplicated or divided into identical images that are in turn filtered through two masks made in such a way that they provide a monotonic or increasing function of the probability that the pattern to be recognized or unknown pattern belongs to Class A or to Class B. Recognition can then be achieved by a comparison of the total amount of light that passes through after such masking process.

In accordance with the present invention, the filter masks that provide the monotonic function of the probability that the unknown pattern belongs to Class A or to Class B are made by the following method, which comprises:

(a) Introducing successively on the surface of interruption of the bundle of optical fibers *n* patterns of Class A, (b) Exposing one same photograph slide to all the *n* successive images that are formed in correspondence with or determined by the *n* patterns of Class A, at the light output from the bundle of optical fibers, with an exposure time one *n*th of the time necessary for a regular exposure, so that the slide obtained is the average photograph of the patterns corresponding to Class A (the so-called Slide A), (c) Introducing successively on the surface of interruption of the bundle of optical fibers *m* (in particular $m=n$) patterns of Class B, (d) Exposing a new photographic slide to all the *m* successive images that are formed in correspondence with the *m* patterns of Class B, at the light output from the bundle of optical fibers, with an exposure time *m*th of the time necessary for a regular exposure, so that the second slide obtained is the average photograph of the patterns corresponding to Class B (the so-called Slide B), (e) Taking the negative of the photograph A (the so-called Slide $\overline{A}$), (f) Taking the negative of the photograph B (the so-called Slide $\overline{B}$), (g) Superimposing the Slides $\overline{A}$ and B and obtaining the so-called Slide $\overline{A}+B$, that constitutes the mask providing a monotonic function of the probability that an unknown pattern belongs to Class A, and (h) Superimposing the Slides A and $\overline{B}$ and obtaining the so-called Slide $A+\overline{B}$, which constitutes the mask providing a monotonic function of the probability that an unknown pattern belongs to Class B.

In accordance with the present invention, apparatus for a pattern recognition system comprises a body structure having an input portion illuminated by light, an examining portion containing a pattern to be recognized, and an output portion upon which an image is formed determined by the pattern to be recognized. A plurality of light-conducting channel fiber members is contained in the body structure, having different paths and being interrupted a plurality of times by the examining portion. In addition, optical dividing means is provided which is coupled to recieve and divide the image formed on the output portion of the body structure into first and second identical images. A first image filtering means is provided and is coupled to receive and filter the first image. It is provided with areas of different light permeability of a conformation providing a monotonic function of the probability that the pattern to be recognized belongs to a certain class, such as Class A. A second image filtering means is provided and is coupled to receive and filter the second image. It is provided with areas of different light permeability of a conformation providing a monotonic function of the probability that the pattern to be recognized belongs to another class, such as Class B. In addition a first light-measuring means can be provided, coupled to receive and measure the total amount of light received from the first image after filtering by the first image-filtering means. A second light-measuring means can be provided, coupled to receive and measure the total amount of light received from the second image after filtering by the second image-filtering means, and there can be provided means to compare the light measurements provided by the first and the second light-measuring means capable of providing an indication that the pattern belongs to the one or the other class.

Figure 2:
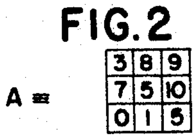
Figure 3:
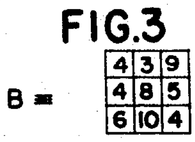
Figure 4:
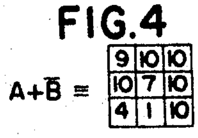
Figure 5:
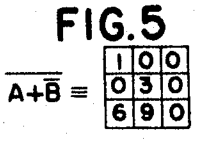
Figure 7:
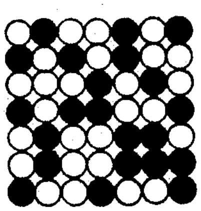
Figure 6:
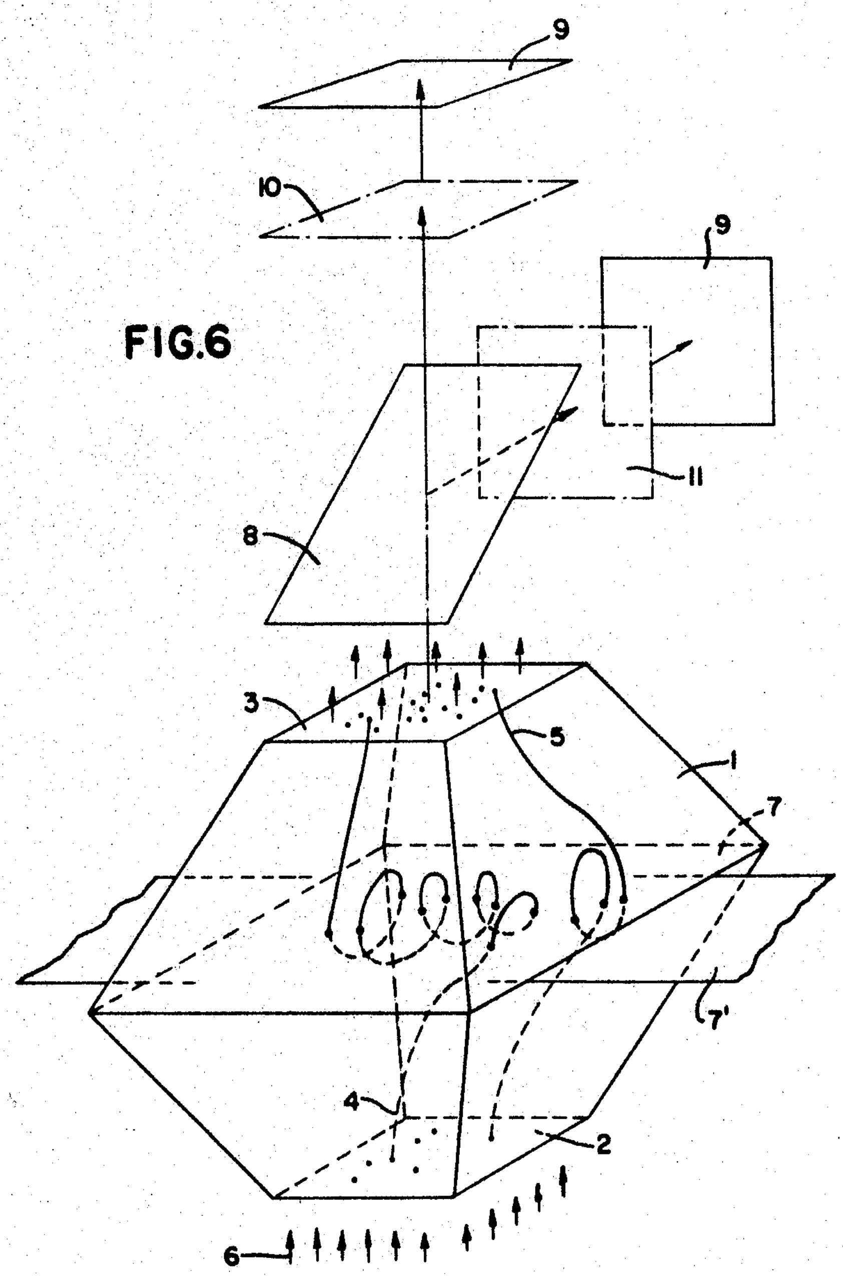
Figures 8, 9, 10:
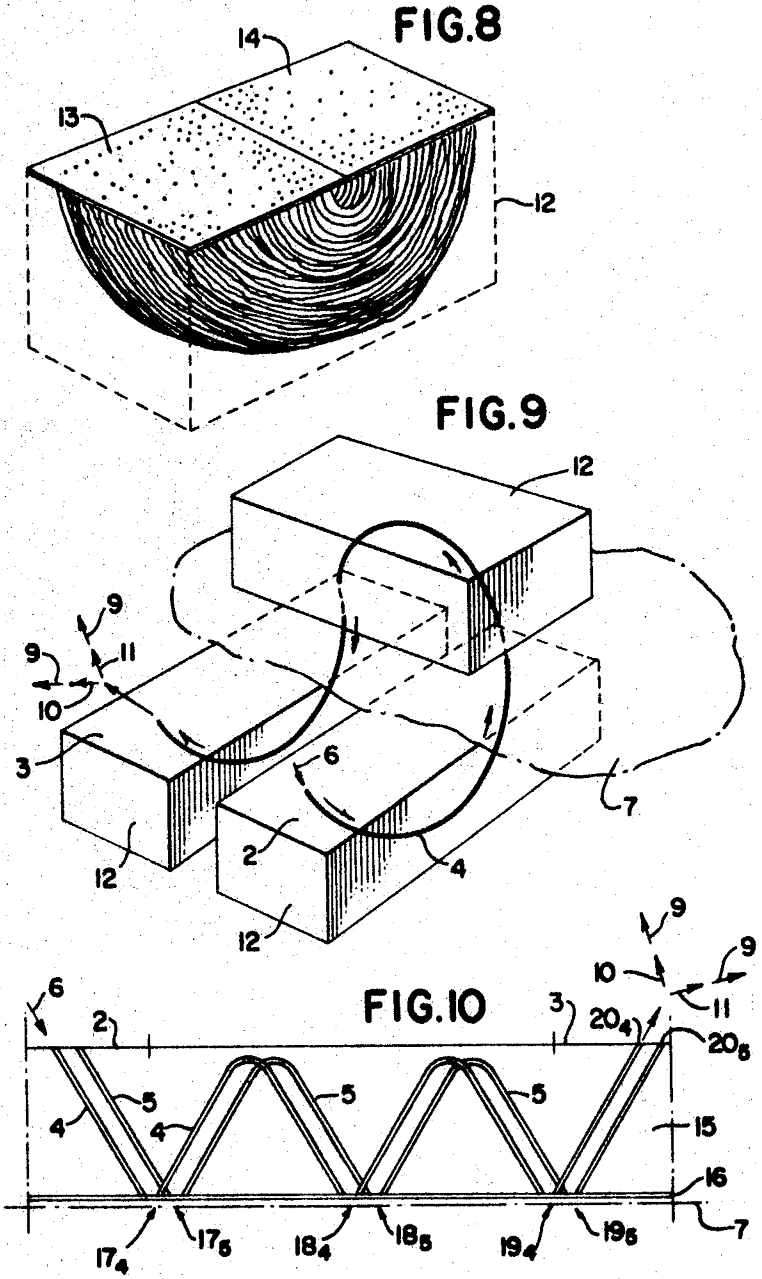

In the accompanying drawings:

FIG. 1 illustrates an embodiment of apparatus according to this invention,

FIG 2 is a diagrammatic illustration in matrix form of a filter mask (Slide A) useful in explaining the present invention, FIG. 3 is a diagrammatic illustration in matrix form of a filter mask (Slide B) useful in explaining the present invention, FIG. 4 is a diagrammatic illustration in matrix form of a filter mask (Slide $A+\overline{B}$ useful in explaining the present invention, FIG. 5 is a diagrammatic illustration in matrix form of a filter mask (Slide $A+\overline{B}$) useful in explaining the present invention, FIG. 6 illustrates another embodiment of apparatus according to this invention for the print-through implementation of the inventive method, FIG. 7 illustrates an image at the output of the apparatus of FIG. 6, FIG. 8 illustrates a bridge of light pipes or light-conducting channel fiber members, FIG. 9 illustrates the joining or coupling together of several light pipe bridges, FIG. 10 illustrates another embodiment of apparatus according to this invention for the reflection implementation of the inventive method, FIG. 11 illustrates Slide A, FIG. 12 illustrates the matrix form of slide A, FIG. 13 illustrates Slide B, FIG. 14 illustrates the matrix form of Slide B, FIG. 15 illustrates Slide $\overline{A}$, FIG. 16 illustrates the matrix form of Slide $\overline{A}$, FIG. 17 illustrates Slide $\overline{A}+B$, FIG. 18 illustrates the matrix form of Slide $\overline{A}+B$, FIG. 19 illustrates Slide $\overline{B}$, FIG. 20 illustrates the matrix form of Slide $\overline{B}$, FIG. 21 illustrates Slide $A+\overline{B}$, and FIG. 22 illustrates the matrix form of Slide $A+\overline{B}$.

Referring to FIG. 1, a bundle of optical fibers or light-conducting channel fiber members starts from the lower surface L and goes to the upper surface U of a truncated double cone. Each fiber connects one point in the lower surface L with one point in the upper surface U through a different path with loops. The device is cut into two parts along the middle plane M. The pattern to be recognized (of the opaque-transparent type) is introduced into the middle plane M between the two halves of the device. The lower surface L is uniformly illuminated. As a result, all those points in the upper surface U will be lighted that are connected to the lower surface L through a fiber that intersects the interposed pattern in the middle plane M only in transparent points. For example, if the pattern introduced in the middle plane M is opaque in any one point $m_1$, $m_2$, $m_3$, $m_4$, or $m_5$, the light from point 1 will not arrive in point $u$. Each point in the upper surface U or each fiber provides therefore a yes/no decision, depending on whether a certain set of points—like the points $m_1$, $m_2$, $m_3$, $m_4$, and $m_5$ in FIG. 1—of the pattern under examination are all transparent at the same time or not. It is therefore a decision on the overall features of the pattern.

In order to distinguish two classes of patterns, Class A versus Class B, the device is "taught" by having presented thereto a certain number of examples of each class. For example, for $m=n=10$, the examples $a_1$, $a_2$, $a_3$, $a_4$, $a_5$, $a_6$, $a_7$, $a_8$, $a_9$, $a_{10}$ and $b_1$, $b_2$, $b_3$, $b_4$, $b_5$, $b_6$, $b_7$, $b_8$, $b_9$, and $b_{10}$ are presented to the device. The above "teaching" procedure involves making two opaque-transparent Slides A and B in the following manner. Slide A is obtained by superimposing ten snapshots of the upper surface U as it appears with the ten examples $a_1$ through $a_{10}$, respectively, in their place at the middle plane M when the lower surface L is uniformly illuminated. The exposure time is the same for each snapshot. The film is processed in such a way that Slide A is transparent in all those points where no light arrived in all ten snapshots; it is completely opaque (opacity 10) in all those points where the light arrived in each of the ten snapshots; it has opacity 7 if in seven snapshots out of ten the light arrived in those points, and so on. If one assumes for simplicity that the enlargement ratio is one-to-one and that there are only nine fibers in the upper surface U, quantized in the three-by-three matrix shown in FIG. 2, the final Slide A looks like FIG. 2, where each number indicates the opacity of the corresponding fiber for that class. Similarly, slide B is obtained using the examples of Class B (three-by-three matrix of FIG. 3). Superimposing Slide A with the photographic negative $\overline{B}$ of Slide B (that is, the opacity of Slide B is the complement to 10 of Slide B), the Slide $A+\overline{B}$ looks like FIG. 4.

Consider now the light that passes through the Slide $A+\overline{B}$, that is proportional to the opacity of its negative $\overline{A+\overline{B}}$ (FIG. 5). One immediately notes that no light passes through Slide $A+\overline{B}$ in all those points where the opacity of Slide A is greater than or equal to the opacity of Slide B. When the opacity of Slide B is greater than the opacity of Slide A, the quantity of light that passes through is equal to such difference. Therefore, the Slide $A+\overline{B}$ behaves as a filter that selects only those fibers that gives a preferential "yes" answer to Class B and gives to such fibers a weight proportional to their "goodness" as discriminating criteria. It is not a logarithmic weight, but it is a good approximation to such a weight.

The Slide $\overline{A}+B$ operates in a similar manner to the Slide $A+\overline{B}$ interchanged.

Therefore, if the image of the upper surface U is duplicated by any suitable optical means and such images are filtered respectively with the two Slides $A+\overline{B}$ and $\overline{A}+B$, respectively, a system is provided that is capable of determining whether an unknown pattern belongs to Class A or to Class B. The device operates as a converter from the property "form" to the more easily measurable quantity "light flux."

FIG. 6 shows one specific illustrative embodiment of a device for implementing the method of the present invention. The device comprises a solid body 1 having two surfaces 2 and 3, one of which—for instance, surface 2—is an input surface and is lighted, uniformly or not. The light 6 penetrates into the body 1, describing in said body different paths by means of light pipes, for instance, two of which are represented in FIG. 6 by the lines 4 and 5. It is to be understood that the body 1 is densely occupied by hundreds or thousands of light pipes and all the light pipes arrive eventually at the second surface 3, which is the output surface of the device, through which the light beams come out from the body 1.

Therefore, each point of the input surface 2 corresponds, or is optically coupled, generally in a purely random way, to one point of the output surface 3 through a complex optical path that according to this invention goes back and forth several times in the central region of the body 1. The body 1 is shown enlarged in its middle so that it may contain optical fibers that go back and forth, crossing many times the surface or plane 7 of the body 1. The surface 7 in FIG. 6 is a middle surface.

In the specific embodiment shown in FIG. 6, the surfaces 2 and 3 are squares, as is the middle surface 7. The middle surface 7 represents the surface of interruption of the bundle of optical fibers. The patterns to be recognized or the slides necessary to "teach" the device are inserted along middle surface 7 and are represented by the tape 7'.

For example, if one assumes that there are only one hundred light pipes in the device and each light pipe crosses several times the pattern to be recognized, then at the output surface 3 light will be obtained only when all the intersections of each light pipe with the pattern occurred in correspondence with transparent points of the pattern. Then, an image will appear on the output surface 3 which is made out of clear and dark zones like those represented in FIG. 7.

The image formed on the output surface 3 is then duplicated by means of a semi-transparent prism 8, or any other equivalent optical system, into two images 9, which are filtered through the masks 10 and 11, made out of the Slides $A+\overline{B}$ and $\overline{A}+B$. The Slides $A+\overline{B}$ and $\overline{A}+B$ are made in the manner described previously to give a monotonic function of the probability that an unknown pattern belongs to Class A or to Class B. In order to recognize the pattern, it is then enough to measure whether there is more light on the channel to the left, containing the mask 10, or on the channel to the right, containing the mask 11. The foregoing can easily be achieved with standard equipment; that is, conventional light-measuring and comparing means.

Instead of building the body 1 with the complex patterns different from one optical fiber to another, it might be more expedient to build the body 1 by making a set of several bridges 12 of light pipes (FIG. 8) that end with two plane surfaces 13 and 14 on the same plane, so that each point of the surface 13 is optically related with one point of the surface 14 through a light pipe, and the paths of the various light pipes are arranged in a random manner. The bridges 12 are then connected together in series in any desired number and order by arranging their input and output surfaces 2 and 3 in the manner shown in FIG. 9. Inside the set of bridges 12, the surface 13 of each bridge is in optical contact with the surface 14 of a successive bridge, so that each fiber of one bridge is aligned with a fiber that continues its path in another bridge. At the surface of interruption of the bundle of optical fibers formed by joining many bridges, the surface 7 is selected. The surface 7 is in correspondence with the plane of contact of the various bridges 12, providing a much simpler way of intersecting several times the various fibers 4, 5, etc., with the middle surface 7.

The devices disclosed heretofore in FIGS. 6 and 9 can be used only when the patterns to be observed and recognized are of the transparent-opaque type. In order to examine patterns on a normal piece of paper (black on white), paths of light are needed which are always on the same side with respect to the pattern. In such a case, the device is made of a one-piece body 15 (FIG. 10), which is on one side of the surface 7 which contains the pattern. The body 15 is built out of many light pipes 4, 5, etc., each one being repeatedly interrupted on a transparent surface 16 that indicates the plane of interruption of the optical fibers.

The light falling on the input surface 2 is conducted to the first point of contact $17_4+17_5$, and so on, with the pattern under examination. When the pattern has a black point at these points of contact, very little light passes through the bridges $17_4$ to $18_4$, $17_5$ to $18_5$, etc.; if the points of contact $18_4$ and $18_5$ are also black, even less light goes through the successive bridges $18_4$ to $19_4$, $18_5$ to $19_5$, so that on the output surface 3 the points $20_4$, $20_5$, etc., will be dark. On the contrary, when the contact points $17_4$, $17_5$, $18_4$, $18_5$, $19_4$, and $19_5$ correspond to white points in the pattern, a diffusion of light will occur, and some light will pass from bridge to bridge, giving rise to lighted points $20_4$ and $20_5$ on the output surface 3.

The image which is formed on the output surface 3 of the body 15 is then duplicated, filtered, and measured as before.

Instead of light pipes or optical fibers, mirrors or prisms may be used. The mirrors or prisms can, through diffusions, refractions, and reflections, originate or provide complex paths for the light beams that will then pass several times through or be in contact with the plane 7 containing the pattern to be examined.

Whether the device takes the forms shown in FIGS. 6, 9, or 10, or mirrors or prisms are used therein, it has to be "taught" by making the masks 10 and 11 with the Slides $A+\overline{B}$ and $\overline{A}+B$.

In order to make the masks 10 and 11 and assuming for simplicity that the bundle of optical fibers is made out of only twenty-five fibers and that only ten examples are necessary for the instruction, the method is as follows:

Ten patterns of the first class under examination (Class A) are introduced successively in plane 7 with the corresponding formation of ten images on the output surface 3.

The same photographic slide is exposed to the output surface 3 with all of the ten successive images with an exposure time one tenth of exposure time necessary for aa normal exposure. This slide constitutes the photographic average of the ten pictures which one could have obtained by taking ten successive pictures of the image that would appear. In this case, twenty-five regions of different opacity are obtained according to the number of times each region has been reached by light. The density in each region can therefore be defined with numbers 0 to 10. The slide obtained appears like the one represented in FIG. 11 and can be expressed in a matrix form like that in FIG. 12, where the numbers inside each region represent tenths of intensity of blackness.

Ten patterns of the second class under examination (Class B) are introduced then in plane 7, obtaining another slide, with a similar process as used before with Class A. The slide thus obtained will appear like the one represented in FIG. 13 and can be expressed in a matrix form like that in FIG. 14.

The negative of the slide corresponding to the photographic average of the images of patterns of Class A provides, for the above-mentioned example, a slide of the type represented by FIGS. 15 and 16. In FIG. 16, the numbers are the complement to ten of the corresponding numbers of FIG. 12 The photographic average of the images of Class $\overline{A}$ (Class $\overline{A}$ being the class of the negatives of A) is thus obtained.

The photographic average $\overline{A}$ is superimposed with the Slide B, and the Slide $\overline{A}+B$ (FIG. 17) is obtained, where the intensity of blackening for each zone is given by the sum of the intensity of blackening of the corresponding zones in Slides A and B with a maximum of ten, since this is maximum blackening, as shown in FIG. 18.

The negative of Slide B provides a slide of the type represented in FIGS. 19 and 20. This is the photographic average of the Class $\overline{B}$ where $\overline{B}$ is the class of the negatives of Class B.

Then, the photographic averages of the images of Class A and Class $\overline{B}$ are superimposed, providing the Slide $A+\overline{B}$ (FIG. 21), where the intensity of blackening of each zone is given by the sum of the intensity of the corresponding zones of Slides A and $\overline{B}$ with a maximum of ten, as shown in FIG. 22.

Accordingly, the masks or filters 10 and 11 are obtained, which allow one to determine whether a pattern belongs to Class A or to Class B, Class B being in particular also the class "not A." In order to discriminate among many classes of patterns, other couples of filters may be provided for each couple of classes, and, as the result of such iterative discrimination of a number of filter couples, a system can be provided to arrive at the specific pattern class.

Numerous and varied rearrangements and modifications of the specific illustrative embodiments described in detail hereinabove can readily be made by those skilled in the art without departing from the spirit and scope of the principles of the present invention. It is obvious that no attempt to exhaustively illustrate all such possibilities has been made.

What is claimed is:

1. An optical device comprising a plurality of light-coupling bridge members, each of said bridge members containing a plurality of light-conducting channel fiber members and ending with two optical surfaces containing ends of said light-conducting channel fiber members, each of said two optical surfaces being optically coupled along an optical coupling plane with similar optical surfaces of successive or preceding bridge members except that an optical surface of two of said bridge members provides a light input surface and a light output surface for said device, an unknown pattern to be examined being positionable along said optical coupling plane among said bridge members.

2. In a pattern recognition system, a body structure having an input portion illuminated by light, an examining portion containing an unknown pattern to be recognized, and an output portion upon which an image is formed determined by said unknown pattern, said body structure containing a plurality of independent optical means providing different light paths from said input portion to said output portion and each of said light paths being interrupted a plurality of times by said examining portion, optical dividing means coupled to receive and divide the image formed on said output portion into first and second identical images, a first image-filtering means coupled to receive and filter said first image, said first image-filtering means having areas of different light permeability of a conformation providing a monotonic function of the probability that the unknown pattern to be recognized belongs to a certain class, and a second image-filtering means coupled to receive and filter said second image, said second image-filtering means having areas of different light permeability of a conformation providing a monotonic function of the probability that the unknown pattern to be recognized belongs to another class, whereby a comparison of the total amount of light provided by each of said two identical images after filtering by said first and said second image-filtering means is capable of providing an indication that said unknown pattern belongs to said certain class or said another class.

3. In a pattern recognition system, a body structure having an input portion illuminated by light, an examining portion containing an unknown pattern to be recognized, and an output portion upon which an image is formed determined by said unknown pattern, said body structure containing a plurality of light-conducting channel fiber members having different paths from said input portion to said output portion and each path being interrupted a plurality of times by said examining portion, optical dividing means coupled to receive and divide the image formed on said output portion into first and second identical images, a first image-filtering means coupled to receive and filter said first image, said first image-filtering means having areas of different light permeability of a conformation providing a monotonic function of the probability that the unknown pattern to be recognized belongs to a certain class, and a second image-filtering means coupled to receive and filter said second image, said second image-filtering means having areas of different light permeability of a conformation providing a monotonic function of the probality that the unknown pattern to be recognized belongs to another class, whereby a comparison of the total amount of light provided by each of said two identical images after filtering by said first and said second image-filtering means is capable of providing an indication that said unknown pattern belongs to said certain class or said another class.

4. The method for recognition of patterns through discrimination between classes of patterns, comprising:

exposing a plurality of optical means providing different optical paths and contained in a body structure having an examining portion to a source of light, said optical paths being interrupted a plurality of times by said examining portion, which contains a pattern to be recognized in a region of said optical paths where each optical path is interrupted by said examining portion a plurality of times, whereby the light emitted from said optical paths after being interrupted by said examining portion forms an image determined by said pattern, dividing said image determined by said pattern into two identical images, and filtering said two identical images individually and in a manner providing different density filtering action to different areas of light of each of said identical images, the total filtering action relative to each of said identical images being monotonically related to the image determined by said pattern and being in accordance with the probability that said pattern belongs to one or another class of patterns, whereby a comparison of the total amount of light provided by each of said two identical images after said filtering is capable of providing an indication that said pattern belongs either to said one class or to said another class.

5. The method for recognition of patterns through discrimination between classes of patterns, comprising:

exposing light-receiving ends of a plurality of light-conducting channel fiber members having different paths and contained in a body structure having an examining portion to a source of light, said plurality of light-conducting channel fiber members being interrupted a plurality of times by said examining portion that contains a pattern to be recognized in a region of said plurality of light-conducting channel fiber members where each light-conducting channel fiber member is interrupted by said examining portion a plurality of times, whereby the light emitted from light-emitting ends of said plurality of light-conducting channel fiber members after being interrupted by said examining portion forms an image determined by said pattern, dividing said image determined by said pattern into two identical images, and filtering said two identical images individually and in a manner providing different density filtering action to different areas of light of each of said identical images, the total filtering action relative to each of said identical images being monotonically related to the image determined by said pattern and being in accordance with the probability that said pattern belongs to one or another class of patterns, whereby a comparison of the total amount of light provided by each of said two identical images after said filtering is capable of providing an indication that said pattern belongs to either said one class or said another class.

6. The method for recognition of patterns through discrimination between classes of patterns comprising:

exposing light-receiving ends of a plurality of light-conducting channel fiber members having different paths and contained in a body structure having an examining portion to a source of light, said plurality of light-conducting channel fiber members being interrupted a plurality of times by said examining portion that contains an unknown pattern to be recognized in a region of said plurality of light-conducting channel fiber members where each light-conducting channel fiber member is interrupted by said examining portion a plurality of times, whereby the light emitted from light-emitting ends of said plurality of light-conducting channel fiber members after being interrupted by said examining portion forms an image determined by said pattern and is capable of providing an indication that said unknown pattern belongs either to one class or to another class, dividing said image determined by said pattern into two identical images, and filtering said two identical images individually and in a manner providing different density filtering action to different areas of light of each of said identical images, the total filtering action relative to each of said identical images being monotonically related to the image determined by said pattern and being in accordance with the probability that said pattern belongs to one or another class of patterns, whereby a comparison of the total amount of light provided by each of said two identical images after said filtering is capable of providing an indication that said pattern belongs either to said one class or to said another class.

7. The method of making two filtering means, one filtering means having areas of different light permeability of a conformation providing a monotonic function of the probability that an unknown pattern to be recognized belongs to a certain class, the other filtering means having areas of different light permeability of a conformation providing a monotonic function of the probability that an unknown pattern to be recognized belongs to another class, comprising:

providing an optical device comprising a body structure having an input portion illuminated by light, an examining portion for containing a pattern, and an output portion upon which an image is formed determined by said pattern, said body structure containing a plurality of light-conducting channel fiber members having different paths from said input portion to said output portion and each member being interrupted a plurality of times by said examining portion, introducing successively to said examining portion of said optical device $n$ patterns of said certain class, making photographically a first light-transparency of all $n$ successive images formed upon said output portion of said optical device with an exposure time for each image one $n$th of the time necessary for a normal exposure, introducing successively to said examining portion of said optical device $m$ patterns of said another class, making photographically a second light-transparency of all $m$ successive images formed upon said output portion of said optical device with an exposure time for each image one $m$th of the time necessary for a normal exposure, making photographically a third light-transparency corresponding to the negative of said first light-transparency, making photographically a fourth light-transparency corresponding to the negative of said second light-transparency, superimposing said second and said third light-transparencies to provide said one filtering means, and superimposing said first and said fourth light-transparencies to provide said other filtering means.

8. An optical device comprising a body structure having two surfaces and containing a bundle of optical fibers, one surface providing an input exposed to light whose rays penetrate into said body structure describing different back-and-forth paths in said optical fibers reaching eventually the other surface providing an output after crossing a plurality of times a plane of said body structure that contains an unknown pattern to be recognized so as to form on said output surface an image that depends on said unknown pattern to be recognized, said body structure being made up of a plurality of bridges of optical fibers placed in series, each bridge ending with two plane surfaces coupled to similar plane surfaces of successive or preceding bridges except for two of them that belong to said input surface and said output surface of said body structure.

References Cited

UNITED STATES PATENTS

| | | | |
|---|---|---|---|
| 3,064,519 | 11/1962 | Shelton | 88—1 |
| 3,255,357 | 6/1966 | Kapany et al. | 88—1 |

OTHER REFERENCES

Brandenberg: Pluggable Fiber Optics Data Searching Apparatus, IBM Technical Disclosure Bulletin, vol. 5, No. 1, June 1962.

JEWELL H. PEDERSEN, *Primary Examiner.*

B. LACOMIS, *Assistant Examiner.*

UNITED STATES PATENT OFFICE
CERTIFICATE OF CORRECTION

Patent No. 3,323,407 June 6, 1967

Augusto Gamba

It is hereby certified that error appears in the above numbered patent requiring correction and that the said Letters Patent should read as corrected below.

Column 1, line 68, after "time" insert -- one --.

Signed and sealed this 16th day of January 1968.

(SEAL)
Attest:

Edward M. Fletcher, Jr.
Attesting Officer

EDWARD J. BRENNER
Commissioner of Patents